United States Patent
Erbes et al.

(10) Patent No.: US 9,969,849 B2
(45) Date of Patent: May 15, 2018

(54) METHOD FOR DRYING PARTICULATE POLYMERS

(71) Applicant: BASF SE, Ludwigshafen (DE)

(72) Inventors: Joerg Erbes, Karlsruhe (DE); Gerhard Lange, Schriesheim (DE); Tobias Kortekamp, Mannheim (DE); Bernhard Linner, Bobenheim-Roxheim (DE); Cecile Schneider, Frankenthal (DE); Angela Ulzhoefer, Ludwigshafen (DE); Robert Heinz, Ludwigshafen (DE); Michael Klemens Mueller, Hassloch (DE)

(73) Assignee: BASF SE, Ludwigshafen (DE)

( * ) Notice: Subject to any disclaimer, the term of this patent is extended or adjusted under 35 U.S.C. 154(b) by 84 days.

(21) Appl. No.: 15/119,857

(22) PCT Filed: Feb. 16, 2015

(86) PCT No.: PCT/EP2015/053195
§ 371 (c)(1),
(2) Date: Aug. 18, 2016

(87) PCT Pub. No.: WO2015/124521
PCT Pub. Date: Aug. 27, 2015

(65) Prior Publication Data
US 2017/0081481 A1    Mar. 23, 2017

(30) Foreign Application Priority Data
Feb. 19, 2014   (EP) .................................. 14155815

(51) Int. Cl.
*C08J 3/14*        (2006.01)
*C08G 75/20*    (2016.01)
(Continued)

(52) U.S. Cl.
CPC .............. *C08J 3/14* (2013.01); *B29B 13/065* (2013.01); *C08J 3/12* (2013.01); *F26B 3/08* (2013.01);
(Continued)

(58) Field of Classification Search
None
See application file for complete search history.

(56) References Cited

U.S. PATENT DOCUMENTS 4,065,426 A    12/1977    Yamawaki et al.
4,213,888 A    7/1980    Karg et al.
(Continued)

FOREIGN PATENT DOCUMENTS

DE      251 754 A1    11/1987
DE    198 49 499 A1    5/2000
(Continued)

OTHER PUBLICATIONS

International Search Report dated Jun. 1, 2015 in PCT/EP2015/053195 filed Feb. 16, 2015.

*Primary Examiner* — Mary Lynn F Theisen
(74) *Attorney, Agent, or Firm* — Oblon, McClelland, Maier & Neustadt, L.L.P.

(57) ABSTRACT

The present invention relates to a process for drying particulate polymers, comprising the steps of:
a) providing a particulate polymer comprising from 60 wt % to 90 wt % of at least one solvent based on the total weight of particulate polymer and solvent,
b) mechanically predrying the particulate polymer to a content of the at least one solvent of from 20 wt % to 50 wt % based on the total weight of particulate polymer and solvent, wherein the mechanical predrying in step b) is carried out with a roller press, and
(Continued)

c) end-drying the particulate polymer to a content of the at least one solvent of from 0 wt % to 15 wt % based on the total weight of particulate polymer and solvent, wherein the particulate polymer is a polymer comprising repeating units of formulae I, II and/or III

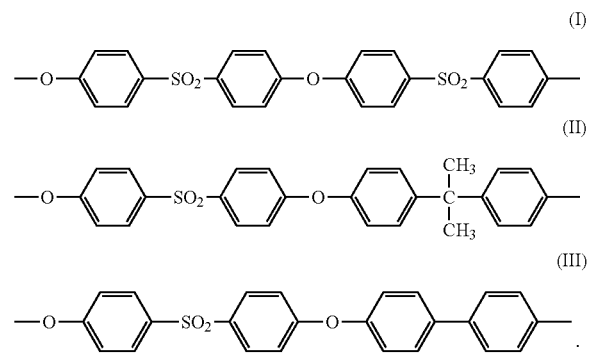

The present invention further relates to a process for working up particulate polymers.

9 Claims, 1 Drawing Sheet

(51) Int. Cl.
*C08G 75/23* (2006.01)
*B29B 13/06* (2006.01)
*F26B 5/14* (2006.01)
*C08J 3/12* (2006.01)
*F26B 3/08* (2006.01)

(52) U.S. Cl.
CPC ............. *F26B 5/14* (2013.01); *C08J 2381/06* (2013.01); *F26B 2200/08* (2013.01)

(56) References Cited

U.S. PATENT DOCUMENTS

| | | |
|---|---|---|
| 4,241,514 A | 12/1980 | Scholz et al. |
| 4,319,409 A | 3/1982 | Scholz et al. |
| 6,641,064 B1 | 11/2003 | Dentler et al. |
| 2010/0297445 A1 | 11/2010 | Guentherberg et al. |
| 2013/0253080 A1 | 9/2013 | Lee et al. |

FOREIGN PATENT DOCUMENTS

| | | |
|---|---|---|
| EP | 0 003 120 A2 | 7/1979 |
| JP | 2010-222506 A | 10/2010 |
| WO | 2009/065891 A1 | 5/2009 |
| WO | 2014/023826 A1 | 2/2014 |

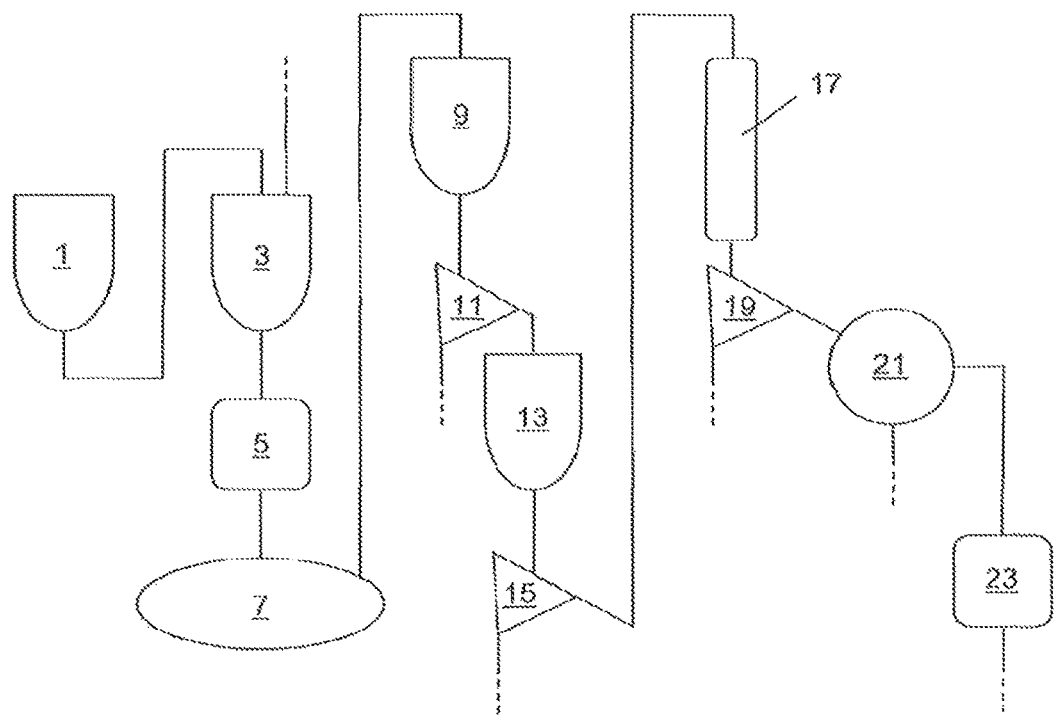

METHOD FOR DRYING PARTICULATE POLYMERS

The present invention relates to a process for drying particulate polymers and a process for working up particulate polymers.

Processes of this type are known in principle from the prior art. This comprises removing by-products and impurities from freshly produced particulate polymers, or at least markedly reducing the content thereof, by extraction processes. Examples thereof are solid-liquid extraction apparatuses which operate according to the cross-countercurrent principle. This comprises moving the particulate polymer in circularly arranged chambers in a clockwise direction in a pulsed fashion and continually showering the bed of particulate polymer with the extraction liquid. The objective is to remove by-products, impurities and solvents from the production of the particulate polymers or to exchange them for solvents that are easier to remove, such as water. The remaining water is removed in conventional thermal drying apparatuses until a predetermined residual content has been reached.

The disadvantage of the prior art processes is, in particular, the high energy costs incurred when operating the thermal drying apparatuses. In particular, virtually complete drying of particulate polymers is only achieved via energy intensive thermal drying apparatuses such as fluidized bed dryers.

It is consequently an object of the present invention to provide an improved process for drying particulate polymers which is less energy intensive while achieving comparable or improved drying results.

In a first aspect, this object of the present invention is achieved by a process comprising the steps of
  a) providing a particulate polymer comprising from 60 wt % to 90 wt % of a solvent (S1) based on the total weight of particulate polymer and solvent (S1),
  FIG.
  b) mechanically predrying the particulate polymer to a content of the solvent (S1) of from 20 wt % to 50 wt % based on the total weight of particulate polymer and solvent (S1), and
  c) end-drying the particulate polymer to a content of the solvent (S1) of from 0 wt % to 15 wt % based on the total weight of particulate polymer and solvent (S1).

The abovementioned object is, in particular, achieved by a process for drying particulate polymers, comprising the steps of
  a) providing a particulate polymer comprising from 60 wt % to 90 wt % of a solvent (S1) based on the total weight of particulate polymer and solvent (S1),
  b) mechanically predrying the particulate polymer to a content of the solvent (S1) of from 20 wt % to 50 wt % based on the total weight of particulate polymer and solvent (S1), wherein the mechanical predrying in step b) is carried out with a roller press, and
  c) end-drying the particulate polymer to a content of the solvent (S1) of from 0 wt % to 15 wt % based on the total weight of particulate polymer and solvent (S1), wherein the particulate polymer is a polymer comprising repeating units of formulae I, II and/or III (I)

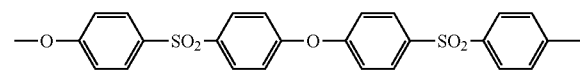

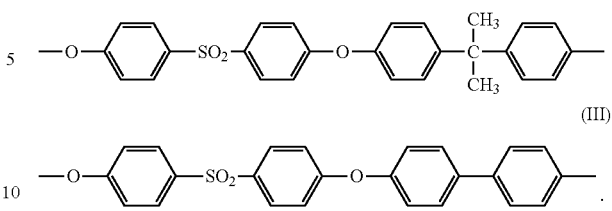

In a second aspect of the present invention the abovementioned object is achieved by processes for working up particulate polymers, comprising the steps of:
  i) providing a polymer solution comprising the polymer and a first organic solvent (S2),
  ii) dropletizing the polymer solution into a precipitation bath comprising a second organic solvent (S3) and water to obtain the particulate polymer by precipitation,
  iii) removing the precipitated particulate polymer from the precipitation bath,
  iv) extracting residues of the first and/or second organic solvent (S2; S3) from the particulate polymer with an extractant,
  v) drying the particulate polymer with the process according to any of claims 1 to 8 and
  vi) optionally finishing the particulate polymer.

The present invention has the substantial advantage that the energy costs for drying particulate polymers can be reduced by more than 50%. At the same time, the required capital expenditure on plant technology can also be more than halved.

The present invention is described in detail hereinbelow.

The first aspect of the present invention relates to a process for drying particulate polymers. The process firstly comprises a step a) providing a particulate polymer comprising from 60 wt % to 90 wt % of a solvent (S1) based on the total weight of particulate polymer and solvent (S1). A step b) comprises mechanically predrying the particulate polymer to a content of the solvent (S1) of from 20 wt % to 50 wt % based on the total weight of particulate polymer and solvent (S1). A step c) comprises end-drying the particulate polymer to a content of the solvent (S1) of from 0 wt % to 15 wt % based on the total weight of particulate polymer and solvent (S1).

The process according to the invention has the advantage that the energy costs for drying particulate polymers can be reduced by more than 50% while the products obtained are of a quality at least equal to that of comparable products obtained from prior art drying processes. At the same time, the required capital expenditure on plant technology can also be more than halved.

The term "particulate polymers" is to be understood as meaning essentially all polymers that are not in the form of a solution or in the liquid state but whose particles are discretely distinguishable. These polymer particles may be either finely dispersed or agglomerated. Typical particle sizes are in the range from 0.5 to 7 mm.

The term "drying" relates to the removal of liquid solvents (S1) present or trapped in the particulate polymer.

The particulate polymer generally has open pores comprising the solvent (S1). Process steps a), b) and c) remove the solvent (S1) from these pores.

The end-drying of the particulate polymer may be carried out until the solvent (S1) has been completely removed within the limits of detection, i.e. to 0 wt % based on the total weight of polymer and solvent (S1).

In accordance with the invention preference is given to end-drying the particulate polymer in process step c) to a content of the solvent (S1) of from 0 to 10 wt %, preferably from 0 to 5 wt %, particularly preferably from 0 to 2 wt %, and in particular from 0 to 1 wt %, based on the total weight of particulate polymer and solvent (S1).

However, it may be technically advantageous to leave small residual contents of solvents (S1) in or on the particulate polymer because complete drying no longer shows any technical effect but merely increases energy costs. It is therefore possible in the context of the present invention to carry out the end-drying of the particulate polymer to a content of the solvent (S1) of from 0.01 wt % to 15 wt %, preferably from 0.01 wt % to 5 wt %, particularly preferably from 0.01 wt % to 2 wt %, and in particular from 0.01 to 1 wt %, in each case based on the total weight of particulate polymer and solvent (S1).

While the process according to the invention achieves drying of particulate polymers at least as effective as that achieved in the prior art, the combination of process steps a), b) and c) achieves at least a 50% reduction in the energy to be expended. The reduction in energy is preferably 70%, especially preferably at least 80%.

In one advantageous development of the invention the mechanical predrying in step b) is carried out with a roller press, also known as a calender. The roller diameter here is from 200 mm to 400 mm at an operating width of from 100 mm to 1200 mm. The applied pressure is between 0.5 t/cm of roller length and 5 t/cm of roller length. This advantageously makes it possible to reduce the mechanical predrying of the particulate polymer in process step b) to a solvent (S1) content of from 20 wt % to 50 wt % based on the total weight of particulate polymer and solvent (S1).

The end-drying in step c) of the process according to the invention is advantageously carried out with a fluidized bed dryer. The fluidized bed dryer makes it possible to reduce the end-drying of the particulate polymer until the solvent (S1) is almost completely absent. While the fluidized bed drier is an energy-intensive apparatus, it is a very efficient option for achieving the desired level of drying.

The solvent (S1) may be precisely one solvent or a mixture of two or more solvents. The solvent (S1) preferably comprises at least 80 wt %, particularly preferably at least 90 wt %, more preferably at least 95 wt % and especially preferably at least 99 wt %, based on the total weight of the solvent (S1).

It has proven to be advantageous for the drying process when the solvent (S1) is water. The advantage of water is that handling it is essentially risk-free and that it is easily removable in the process according to the invention. Thus the apparatus for the mechanical predrying in step b) need not be enclosed to prevent escape of water as the solvent (S1). Water may further be readily reduced to the desired solvent content by the mechanical predrying in step b) and efficiently removed in the end-drying.

In one preferred embodiment of the invention the particulate polymer is in the form of particles having a diameter of from 0.5 to 7 mm in step a). It is particularly preferable when the diameter of the polymer spheres is between 2 and 6 mm. Smaller particle sizes would require expenditure of markedly more power and thus more energy for the mechanical predrying (process step b)). When on the other hand the particle size is larger the mechanical predrying can no longer be carried out efficiently.

It has proven to be advantageous for the end-drying step when the mechanically predried particulate polymer is comminuted after step b) and before step c). The mechanical predrying (process step b)) of the particulate polymer results in severe compaction of said polymer and said polymer is therefore in the form of large agglomerates or pieces of a type of compact. These agglomerates or pieces are comminuted to enhance the effectiveness of the end-drying provided in step c). The comminution is in particular carried out until the particle size of the particulate polymer is virtually the same as its original value.

In one preferred embodiment of the invention the particulate polymer is in the form of particles having a diameter of from 0.5 to 7 mm after step c). It is particularly preferable when the diameter of the polymer spheres is between 2 and 6 mm. Smaller particle sizes would require expenditure of markedly more power and thus more energy for the mechanical predrying (process step b)). When on the other hand the particle size is larger the mechanical predrying (process step b)) can no longer be carried out efficiently.

The particle size of the particulate polymer is determined by a sieve analysis according to DIN 66165.

In one particularly preferred embodiment of the present invention the particulate polymer is a polymer comprising repeating units of formulae I, II and/or III.

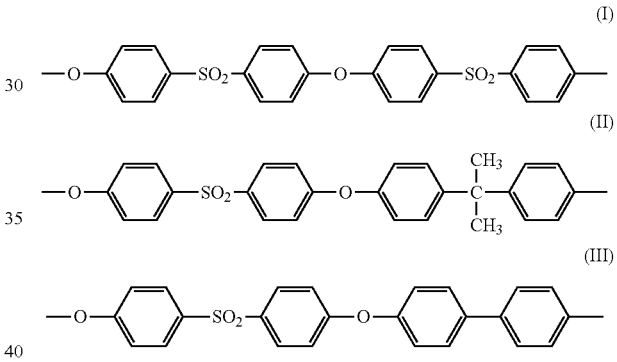

Preference is given to polymers consisting of the repeating units of formulae I, II and/or III. These polymers are known as polyethersulfone (PESU) (I), polysulfone (PSU) (II) and polyphenylene ether sulfone (PPSU) (III) and are particularly preferred in accordance with the invention. Said polymers are marketed by BASF SE under the trade names Ultrason® E (I), Ultrason® S (II) and Ultrason® P (III).

The use of these polymers as the particulate polymer is preferred due to their high-temperature stability with balanced combinations of properties and also their favorable cost/performance ratio.

In a second aspect of the present invention, a process for working up particulate polymers is, comprising the steps of:
  i) providing a polymer solution comprising the polymer and a first organic solvent (S2),
  ii) dropletizing the polymer solution into a precipitation bath comprising a second organic solvent (S3) and water to obtain the particulate polymer by precipitation,
  iii) removing the precipitated particulate polymer from the precipitation bath,
  iv) extracting residues of the first and/or second organic solvent (S2; S3) from the particulate polymer with an extractant,
  v) drying the particulate polymer with the process according to any of claims 1 to 8 and
  vi) optionally finishing the particulate polymer.

The process according to the second aspect of the present invention has the advantage that it provides for the first time an efficient, in particular energy efficient, workup process from the polymer solution to the ready-finished particulate polymer. The energy savings for this process are 50% or more compared to conventional workup processes in which, in particular after production and extraction of the polymer, conventional drying processes are employed.

It is preferable to employ N-methylpyrrolidone as first and/or second organic solvent (S2; S3) in the workup process according to the invention.

It is preferable when the extractant employed in process step iv) is the solvent (S1), so that after process step (iv) a particulate polymer is obtained that comprises 60 to 90 wt % of the solvent (S1) based on the total weight of particulate polymer and solvent (S1).

It is further preferable for the particulate polymer to be a polyethersulfone.

Further objectives, features, advantages and possible applications will become apparent from the following description of the working examples of the invention with reference to the FIGURE. All features described and/or illustrated in FIGURES, alone or in any combination, form the subject matter of the invention even irrespective of their combination in the claims or the dependency references thereof.

FIG. 1 shows a schematic diagram of the inventive workup process with the inventive process for drying particulate polymers.

The present invention is elucidated hereinbelow with reference to a specific working example in which a polyethersulfone is produced and worked up. However, the present invention is also suitable for other types of particulate polymers.

According to the prior art polyethersulfone polymer granules comprise nonvaporizable impurities and amounts of potassium chloride of from 200 ppm to 500 ppm. This leads to poor transparency and discoloration in the production of final articles. In order to remedy these deficiencies a precipitation process for polyethersulfones was developed with which the polymer solution is initially converted into a solid particulate form in which the impurities and by-products may be removed by a solid-liquid extraction. This makes it possible to markedly improve the product properties in terms of transparency, intrinsic color, long term behavior under tensile flexural stress and processing stability during injection mold processing at up to 400° C. Here, the particles produced by controlled jet breakup (dropletization) and precipitated in aqueous N-methylpyrrolidone solutions are extracted essentially with water.

Workup suffered the problem that the freshly precipitated polyethersulfone polymer still comprised about 160% to 220% of N-methylpyrrolidone per 100% of polymer and from 100 ppm to 1000 ppm of potassium chloride per 100% of polymer. At these N-methylpyrrolidone contents the polyethersulfone polymer particles were not stable and thus not storable. It was found that the particles melted at temperatures as low as 80° C. to 90° C. Hence, in accordance with the invention about 75% to 80% of the N-methylpyrrolidone and potassium chloride is removed immediately after the precipitation.

Since the precipitated and extracted polyethersulfone particles consist of about 25% polymeric solid and about 75% water (S1), removal of all of the water (S1) by known procedures, for example in a fluidized bed dryer, is associated with a very high energy outlay. Hence, in accordance with the invention a large part of the water (S1) is removed before the end-drying by mechanical crushing (process step b)) and pressing-out of the polyethersulfone polymer particles.

FIG. 1 shows a diagram for the wet workup of polyethersulfones. A polyethersulfone solution (18% in N-methylpyrrolidone) obtained from the polycondensation reactor 1 is initially charged into a vessel 3 and diluted with a suitable solvent (e.g. N-methylpyrrolidone). This solution is passed into a reservoir vessel 7 via a filter apparatus 5 in which salts for example are removed from the production process. From here the solution is passed to the top of a vessel 9 where the solution is formed into jets using an arrangement of parallel capillaries in a stainless steel plate. After a particular fall height these jets break up into droplets (so-called dropletization) which fall, in the lower part of the vessel 9, into a precipitation bath (e.g. NMP/$H_2O$). The polyethersulfone polymer is precipitated therein and the polymer spheres cured after a predetermined residence time are supplied to a sieve 11, in particular a shaker sieve, via a syphon line.

Therein, the cured polyethersulfone polymer is removed from the precipitation bath liquid and transferred into the vessel 13. The precipitation bath liquid may be recycled into the vessel 9 via a connecting line which is not shown. A pre-extraction is carried out in the vessel 13, for example comprising treatment of the polymer particles with a 15 percent aqueous N-methylpyrrolidone solution for a residence time of about one hour at 85° C. Before this step the polyethersulfone polymer may comprise not only nonvaporizable impurities but also from 200 ppm to 500 ppm of potassium chloride, more highly concentrated N-methylpyrrolidone and color-imparting substances formed from by-products.

After the pre-extraction the polyethersulfone polymer particles are supplied to a further sieve 15, likewise preferably a shaker sieve, and separated from the extraction solution. The polyethersulfone polymer particles are further purified in an apparatus for fine extraction 17, for example a carousel extractor. The liquid removed in the sieve 15 may likewise be recycled into the vessel 13 via a connecting line which is not shown. It is preferable when water is employed as extraction medium in the fine extractor 17. The polyethersulfone polymer particles obtained in this step are removed from the water via a further sieve 19.

After this step, the polyethersulfone polymer particles essentially no longer comprise any potassium chloride or N-methylpyrrolidone. The particles thus obtained consist of about 25% polymeric solid and about 75% water (S1). In the subsequent step said particles are supplied to a roller press 21 in which the extraction medium, water (S1) in the present example, is pressed out of the polymer.

In one specific embodiment an Alexanderwerk roller press was employed in which solids contents of between 50% and 60% at throughputs of 60 kg per hour were achieved. The roller width was 330 mm at a roller diameter of 300 mm.

After exiting the roller press the polyethersulfone polymer is obtained as a filter cake of flat compacts (known as slugs). Before the end-drying these flat compacts are again divided into the original individual particles which in the present embodiment is achieved using a rubbing-action fine granulator not shown in FIG. 1.

The predried polyethersulfone polymer from the roller press 21 is finally dried in a fluidized bed dryer 23.

Pursuant to the invention the effect of the predrying on the costs of the final fluidized bed drying was calculated. This comprised calculating the capital expenditure and energy costs (steam and electricity) for the fluidized bed drying as a function of the starting content of solvent (20 wt % to 75 wt %). The most important parameters are reported in Table 1 which follows.

TABLE 1

| Plant | Starting moistness (wt %) | Capital expenditure (million €) | Energy (thousand €/a) |
|---|---|---|---|
| without preliminary demoistening (prior art) | 75 | 3.5 | 250 |
| with preliminary demoistening (according to the invention) | 45 | 1.4 | 80 |
| with improved preliminary demoistening (according to the invention) | 30 | 0.8 | 40 |

Compared to the process according to the invention, in the conventional processes without a mechanical predrying the capital expenditure costs for a fluidized bed plant are more than doubled and the energy costs are in fact trebled.

LIST OF REFERENCE NUMERALS

1 Polycondensation reactor
3 Vessel (dilution)
5 Filter apparatus
7 Reservoir vessel
9 Vessel (dropletization)
11 Sieve
13 Vessel (pre-extraction)
15 Sieve
17 Fine extraction
19 Sieve
21 Roller press
23 Fluidized bed dryer

The invention claimed is:

1. A process for drying particulate polymers, comprising:
   a) mechanically pre-drying a particulate polymer comprising from 60 wt % to 90 wt % of a solvent (S1) based on the total weight of particulate polymer and solvent (S1),
   to a content of the solvent (S1) of from 20 wt % to 50 wt % based on the total weight of particulate polymer and solvent (S1), wherein the mechanical pre-drying is carried out with a roller press, and
   b) end-drying the particulate polymer to a content of the solvent (S1) of from 0 wt % to 15 wt % based on the total weight of particulate polymer and solvent (S1),
   wherein the particulate polymer is a polymer comprising repeating units of formulae I, II and/or III

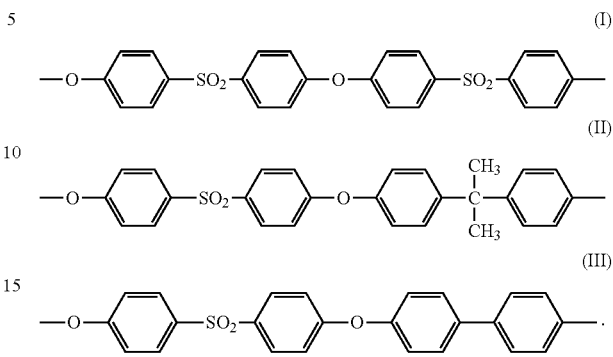

2. The process according to claim 1, wherein the end-drying is carried out with a fluidized bed dryer.

3. The process according to claim 1, wherein the solvent (S1) is water.

4. The process according to claim 1, wherein the particulate polymer has an initial particle size of from 0.5 mm to 7 mm.

5. The process according to claim 1, wherein the mechanically pre-dried particulate polymer is comminuted after the mechanical pre-drying and before the end-drying.

6. The process according to claim 1, wherein the particulate polymer has a particle size of from 0.5 mm to 7 mm after the end-drying.

7. The process according to claim 1, wherein the particulate polymer is a polyethersulfone.

8. A process for working up particulate polymers, comprising:
   i) dropletizing a polymer solution comprising a polymer and a first organic solvent (S2) into a precipitation bath comprising a second organic solvent (S3) and water to obtain a particulate polymer by precipitation,
   ii) removing the precipitated particulate polymer from the precipitation bath,
   iii) extracting residues of the first and/or second organic solvent from the particulate polymer with an extractant,
   iv) drying the particulate polymer with the process according to claim 1 and
   v) optionally finishing the particulate polymer.

9. The process according to claim 8, wherein the first and/or second organic solvent is N-methylpyrrolidone.

* * * * *

UNITED STATES PATENT AND TRADEMARK OFFICE
CERTIFICATE OF CORRECTION

PATENT NO. : 9,969,849 B2
APPLICATION NO. : 15/119857
DATED : May 15, 2018
INVENTOR(S) : Joerg Erbes et al.

Page 1 of 1

It is certified that error appears in the above-identified patent and that said Letters Patent is hereby corrected as shown below:

In the Specification

Column 4, Line 45 "(lII)" should read -- (III) --

Signed and Sealed this
Sixth Day of August, 2019

Andrei Iancu
*Director of the United States Patent and Trademark Office*